United States Patent
Song

(10) Patent No.: US 9,139,253 B2
(45) Date of Patent: Sep. 22, 2015

(54) ELECTRIC BICYCLE

(71) Applicant: Joon Kyu Song, Seognam-si (KR)

(72) Inventor: Joon Kyu Song, Seognam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/109,518

(22) Filed: Dec. 17, 2013

(65) Prior Publication Data

US 2015/0075887 A1 Mar. 19, 2015

(30) Foreign Application Priority Data

Sep. 17, 2013 (KR) .......... 10-2013-0111661

(51) Int. Cl.
 *B60T 7/16* (2006.01)
 *B62M 6/45* (2010.01)
 *B62M 6/65* (2010.01)

(52) U.S. Cl.
 CPC .. *B62M 6/45* (2013.01); *B62M 6/65* (2013.01)

(58) Field of Classification Search
 CPC .......................................................... B62D 1/28
 USPC .............. 180/65.1, 223, 65.2–65.3, 205–207, 180/219–220, 230–231
 See application file for complete search history.

(56) References Cited

U.S. PATENT DOCUMENTS

| 8,348,798 B2* | 1/2013 | Lo .................. 475/149 |
| 2009/0181826 A1* | 7/2009 | Turner ............... 482/4 |
| 2011/0133542 A1 | 6/2011 | Ratti et al. |
| 2011/0259658 A1 | 10/2011 | Huang et al. |
| 2012/0083375 A1 | 4/2012 | Lo |

FOREIGN PATENT DOCUMENTS

| EP | 1 820 727 | 8/2007 |
| EP | 2 308 436 | 4/2011 |
| JP | 9-301262 | 11/1997 |
| JP | 3156374 U | 12/2009 |
| KR | 10-2011-0108493 | 10/2011 |
| KR | 10-2012-0058813 | 6/2012 |
| KR | 20-0461596 | 7/2012 |
| TW | 201 325 034 | 6/2013 |
| WO | 2010/077300 | 7/2010 |
| WO | 2011/120124 | 10/2011 |
| WO | 2012/123802 | 9/2012 |

OTHER PUBLICATIONS

Office Action dated Dec. 29, 2014 for Korean Patent Application No. 10-2013-0111661 and its English machine translation by Google Translate.

(Continued)

*Primary Examiner* — John Walters
*Assistant Examiner* — James Triggs
(74) *Attorney, Agent, or Firm* — Ladas & Parry, LLP

(57) ABSTRACT

Disclosed is an electric bicycle. The electric bicycle includes a hub motor assembly provided at a wheel to supply driving force, an electronic control unit provided in the hub motor assembly, and a wireless communication device mounted to a wheel shaft and electrically connected to the electronic control unit.

4 Claims, 6 Drawing Sheets

(56) References Cited

OTHER PUBLICATIONS

Extended European Search Report dated Feb. 5, 2015 for European Patent Application No. 13197648.2.

Notice of Allowance dated Jun. 10, 2015 for Korean Patent Application No. 10-2013-0111661 and its English summary provided by Applicant's foreign counsel.

* cited by examiner

ELECTRIC BICYCLE

CROSS-REFERENCE TO RELATED APPLICATION

This application claims the benefit of Korean Patent Application No. 10-2013-0111661, filed on Sep. 17, 2013 with the Korean Intellectual Property Office, the disclosure of which is incorporated in its entirety herein by reference.

BACKGROUND

1. Field

Embodiments of the present invention relate to an electric bicycle equipped with a wireless communication module such as Bluetooth or the like.

2. Description of the Related Art

In general, bicycles are one of short-distance transportation. Recently, electric bicycles capable of traveling by power of a motor are being developed so as to travel a long distance or reduce exhaustion of rider's physical strength.

In order to provide driving force for traveling, a hub motor assembly is mounted to a front wheel or rear wheel (commonly called a "wheel" hereinafter) of an electric bicycle, and rotates the wheel.

A hub motor assembly includes a motor housing connected to a wheel by spokes. Rotational force generated by a rotor and a stator in the motor housing rotates the wheel together with the motor housing. The rotational force of the motor may be controlled by rider's manipulation using a control unit such as an ECU or the like. Further, based on detection results of rider's pedaling force when cycling uphill, operation of the motor may be more systematically controlled. A sprocket, which is connected to pedals by a chain, is mounted outside the motor housing. Through the chain connected to the sprocket, a rider may ride a bicycle by his/her pedaling force.

CITATION LIST

Patent Literature

Korean Patent Laid-Open Publication No. 2012-0058813 (published on Jun. 8, 2012)

SUMMARY

It is an aspect of the present invention to provide an electric bicycle equipped with a wireless communication module.

Additional aspects of the invention will be set forth in part in the description which follows and, in part, will be obvious from the description, or may be learned by practice of the invention.

In accordance with one aspect of the present invention, an electric bicycle includes a hub motor assembly provided at a wheel to supply driving force, an electronic control unit provided in the hub motor assembly, and a wireless communication device mounted to a wheel shaft and electrically connected to the electronic control unit.

The wheel shaft may be provided with a sprocket, which is connected to pedals, at one end portion thereof, and may be provided with the wireless communication device at the other end portion thereof.

The wireless communication device may include Bluetooth.

The wireless communication device may include a module casing which includes a link configured to be coupled to the wheel shaft and a case formed integrally with the link and configured to accommodate a wireless communication module therein.

The wireless communication device may support wireless communication with a rider's terminal.

As described above, since the wireless communication module such as Bluetooth is mounted to the wheel shaft that is disposed closest to the electronic control unit and is configured not to rotate, electric wiring may be simplified.

In addition, since the wireless communication module mounted to the wheel shaft is not exposed, it does not affect bicycle riding and aesthetics of the electric bicycle.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
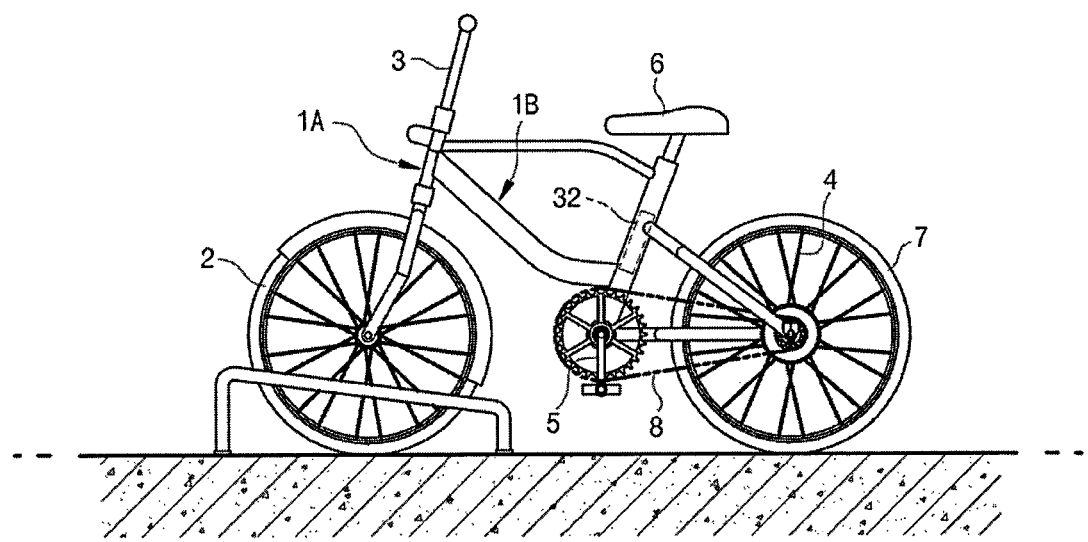
FIG. 1 is a view illustrating an electric bicycle according to an embodiment of the present invention.

Now, preferred embodiments of the present invention will be described in detail with reference to the annexed drawings. The preferred embodiments described in the following specification and shown in the accompanying drawings are illustrative only and are not intended to represent all aspects of the invention, so that it is to be understood that various equivalents and modifications can be made without departing from the spirit of the invention. In the drawings, elements unrelated to the embodiments of the present invention are omitted from depiction for clarity, and the component's width, length, thickness, etc. are exaggerated for convenience. Like numbers refer to like elements throughout the description of the figures.

In general, as shown in FIG. 1, a bicycle includes a handle frame 1A consisting of a front wheel 2 and a handlebar 3, and a main frame 1B consisting of pedals 5, a saddle 6 and a rear wheel 7. The pedals 5 and the rear wheel 7 are connected to each other by a chain 8. The handle frame 1A is rotatably coupled to the main frame 1B so that a rider can steer. A brake is mounted to the handle frame 1A. The main frame 1B may have a foldable structure for high portability.

Figure 2:
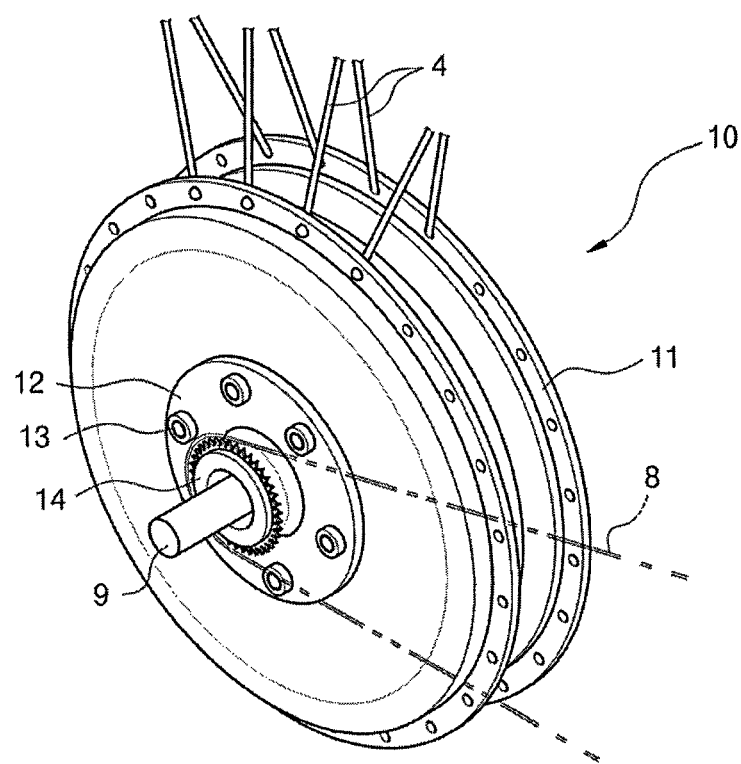
FIG. 2 is an enlarged view illustrating a wheel of the electric bicycle according to an embodiment of the present invention.
Figure 3:
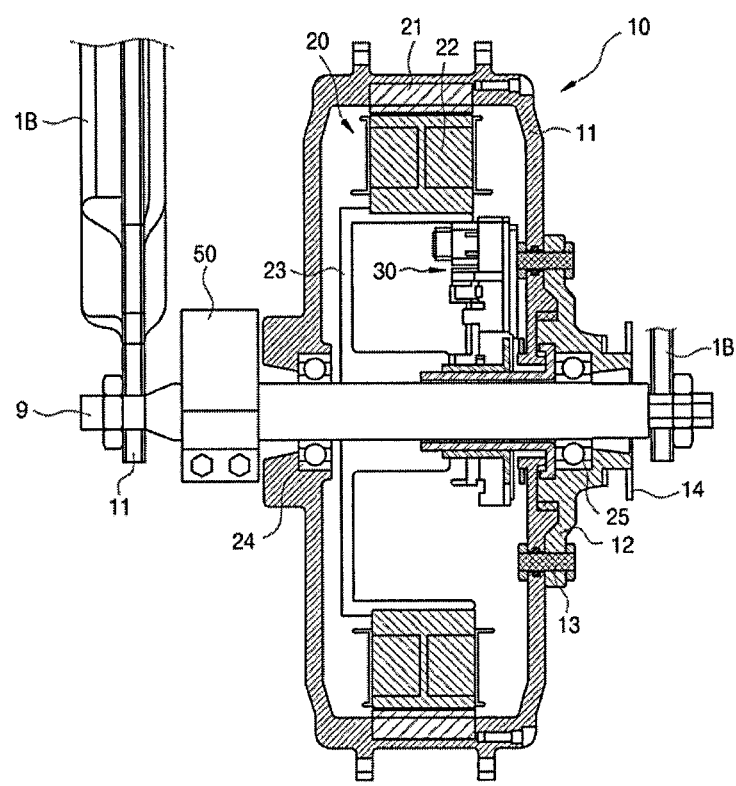
FIG. 3 is a sectional view illustrating the wheel of the electric bicycle according to an embodiment of the present invention.

As shown in FIGS. 2 and 3, an electric bicycle according to an embodiment of the present invention includes a hub motor assembly 10 to provide power of a motor for the electric bicycle.

Referring to the drawings, the hub motor assembly 10 is mounted to a wheel shaft 9 which is mounted to the main frame 1B. More particularly, the hub motor assembly 10 includes a motor housing 11 rotatably mounted to the wheel (front wheel or rear wheel) shaft 9, and a cover housing 12 coupled to the motor housing 11. The motor housing 11 and the cover housing 12 are engaged with each other using bolts 13.

A plurality of spokes 4 are provided along an outer peripheral surface of the motor housing 11. The motor housing 11 is connected to the wheel by the spokes 4. The motor housing 11 is rotatably mounted to the wheel shaft 9. As shown in FIG. 3, the wheel shaft 9 penetrates the center of the motor housing 11, and both end portions of the wheel shaft 9 are fixed to a pair of forks provided at the main frame 1B. The motor housing 11 has an accommodation space therein for a motor unit 20 to generate rotational force to drive the wheel. The motor unit 20 will be explained later.

The cover housing 12 is rotatably mounted to the wheel shaft 9, and is coupled to a lateral surface of the motor housing 11. The cover housing 12 has a through-hole in the middle thereof, through which the wheel shaft 9 penetrates. A sprocket 14 is provided in front of the cover housing 12. The sprocket 14 is connected to the chain 8, to thereby receive rotational force by pedaling.

The motor housing 11 and the cover housing 12 coupled thereto form the hub motor assembly 10. The hub motor assembly 10 rotates together with the wheel by rotational force generated from the motor unit 20 provided thereinside.

The motor unit 20 may be a motor which is commonly used. The motor unit 20 includes a stator 22 which is fixed to the wheel shaft 9 by a connecting plate 23 and has a ring shape around which a coil (not shown) is wound, and a rotor 21 which is spaced apart from the stator 22 and mounted to an inner peripheral surface of the motor housing 11. A plurality of magnets (not shown) are mounted to the rotor 21. If power is applied to the coil of the stator 22, repulsive and attractive forces are generated between the magnets and the coil, thereby rotating the rotor 21. As the rotor 21 rotates, the motor housing 11 and the cover housing 12 coupled thereto also rotate together with the wheel. In order to facilitate rotation of the motor housing 11 and the cover housing 12, bearings 24 and 25 are provided between each of the housings 11 and 12 and the wheel shaft 9.

The motor unit 20 is electrically connected to an electronic control unit (ECU) 30 which is mounted to the connecting plate 23 inside the motor housing 11. The motor unit 20 operates according to electrical control signals from the ECU 30, and thereby rotates the wheel.

Figure 4:
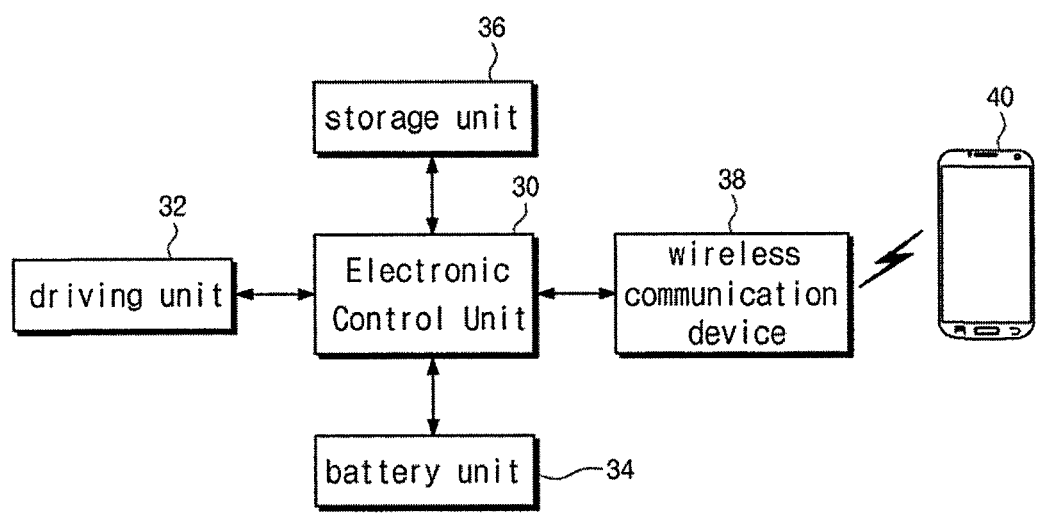
FIG. 4 is a block diagram illustrating an electronic control unit mounted to the electric bicycle according to an embodiment of the present invention.

The ECU 30, as shown in FIG. 4, includes a driving unit 32, a battery unit 34, a storage unit 36 and a wireless communication device 38.

The driving unit 32 means the motor unit 20. The battery unit 34 supplies power to various constitutional elements including the ECU 30. The battery unit 34 includes a battery (refer to 35 in FIG. 1) which may be connected to an adapter (not shown) so as to be charged from the outside.

The storage unit 36 stores unique identification information of the electric bicycle or information for wireless communication with a rider's terminal 40 which will be described later.

The wireless communication device 38 supports short-range wireless communication with the rider's terminal 40, using any one or a combination of the following wireless technologies: Bluetooth, Infrared Data Association (IrDA), Ultra Wideband (UWB) and ZigBee.

The ECU 30 receives a request for communication linkage from the rider's terminal 40 through the wireless communication device 38, and performs communication linkage with the rider's terminal 40 so as to exchange data or information. For instance, if the wireless communication device 38 is a Bluetooth module, the ECU 30 performs Bluetooth pairing for communication linkage with the rider's terminal 40.

The rider's terminal 40 includes wireless communication-enabled mobile devices such as tablet computers, laptop computers, cell phones, personal digital assistants (PDAs), smart phones, tablet terminals or the like.

Figure 5:
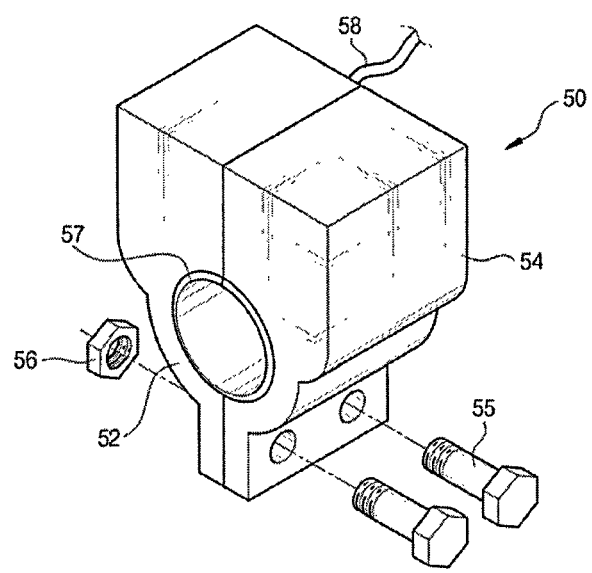
FIG. 5 is a perspective view illustrating a module casing to mount a wireless communication device to the electric bicycle according to an embodiment of the present invention.

As shown in FIG. 5, in order to facilitate installation of the wireless communication device to the electric bicycle, the wireless communication device 38 is mounted to the wheel shaft 9 using a module casing 50. Because the wheel shaft 9 is disposed closest to the ECU 30 of the hub motor assembly 10 mounted to the wheel and does not rotate, the wireless communication device 38 is mounted to the wheel shaft 9. For this reason, installation and electric wiring are simplified, and the wireless communication device 38 is not exposed.

The module casing 50 includes a hollow cylindrical link 52 through which the wheel shaft 9 is fitted, and a case 54 which is integrally formed with the link 52 and accommodates a wireless communication module (not shown) therein. The link 52 and the case 54 are vertically split into two parts, respectively. Therefore, the module casing 50 is mounted to the wheel shaft 9 in such a manner that the wheel shaft 9 is interposed between the two separated parts of the module casing 50 and then the two separated parts of the module casing 50 are securely engaged using bolts 55 and nuts 56. A shock absorbing insulation pad 57 may be provided at an inner surface of the link 52. A cable 58 of the wireless communication module is electrically connected to the ECU 30 disposed in the hub motor assembly 10 through a wire hole (not shown) formed adjacent to the wheel shaft 9.

Because the sprocket 14 connected to the pedals 5 is mounted to one end portion of the wheel shaft 9 as depicted in FIG. 3, the module casing 50 accommodating the wireless communication module therein is mounted to the other end portion of the wheel shaft 9.

Figure 6:
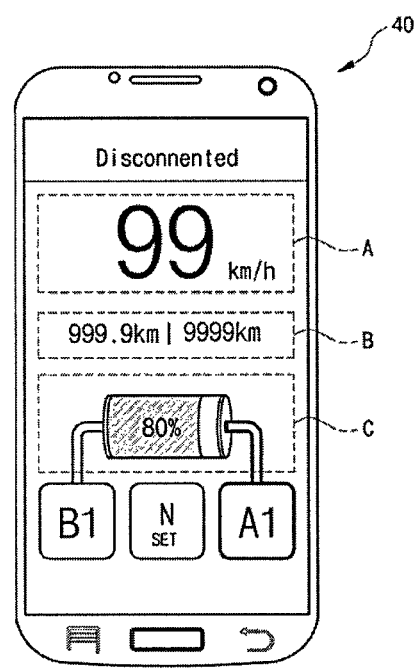
FIG. 6 is a view illustrating a screen of a rider's terminal which wirelessly communicates with the wireless communication device mounted to the electric bicycle according to an embodiment of the present invention.

FIG. 6 is a view illustrating exemplary information displayed on a screen of the rider's terminal which has been Bluetooth paired with the wireless communication device of the ECU. As shown in the drawing, when Bluetooth pairing is completed, a variety of information such as a riding speed A, a riding distance B, a battery capacity C and the like, provided from the electric bicycle may be displayed on a screen of the rider's terminal 40. To the contrary, various information, such as pedal loads, acceleration and the like, input to the rider's terminal 40 through an input device thereof such as a touch screen may be transmitted to the ECU 30 through wireless communication.

The aforementioned information exchanged between the electric bicycle and the rider's terminal through wireless communication is merely illustrative, and various other information such as identification information of the electric bicycle, GPS information, gyroscope information and the like may also be exchanged.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric bicycle comprising:
a hub motor assembly provided at a wheel to supply driving force;
an electronic control unit provided in the hub motor assembly; and
a wireless communication device mounted to a wheel shaft of the electric bicycle and electrically connected to the electronic control unit,
wherein the wheel shaft is provided with a sprocket, which is connected to pedals, at one end portion thereof, and is provided with the wireless communication device at the other end portion thereof.

2. The electric bicycle according to claim 1, wherein the wireless communication device includes Bluetooth.

3. An electric bicycle comprising:
a hub motor assembly provided at a wheel to supply driving force;
an electronic control unit provided in the hub motor assembly; and
a wireless communication device mounted to a wheel shaft of the electric bicycle and electrically connected to the electronic control unit,
wherein the wireless communication device includes a module casing which includes a link configured to be coupled to the wheel shaft and a case formed integrally with the link and configured to accommodate a wireless communication module therein.

4. The electric bicycle according to claim 3, wherein the wireless communication device supports wireless communication with a rider's terminal.

* * * * *